(12) United States Patent
Blaisdell

(10) Patent No.: US 8,479,926 B1
(45) Date of Patent: Jul. 9, 2013

(54) POT LID HOLDING SYSTEM

(76) Inventor: Timothy Blaisdell, Lowell, MA (US)

(*) Notice: Subject to any disclaimer, the term of this patent is extended or adjusted under 35 U.S.C. 154(b) by 23 days.

(21) Appl. No.: 13/198,400

(22) Filed: Aug. 4, 2011

(51) Int. Cl.
*A47J 47/16* (2006.01)

(52) U.S. Cl.
USPC ................................. 211/41.11; 211/181.1

(58) Field of Classification Search
USPC ............. 211/181.1, 41.11, 85.31, 60.1, 61, 211/74, 70.2; 248/153, 106, 107
See application file for complete search history.

(56) References Cited

U.S. PATENT DOCUMENTS

| | | | |
|---|---|---|---|
| 2,925,235 A * | 2/1960 | Jaros | 248/153 |
| 2,934,210 A * | 4/1960 | Jordan | 211/41.11 |
| 3,104,778 A * | 9/1963 | Leonard | 221/34 |
| 4,790,503 A | 12/1988 | Pohler | |
| 4,911,310 A | 3/1990 | Raishe et al. | |
| 5,000,326 A | 3/1991 | Vaughn | |
| 5,096,072 A * | 3/1992 | Link | 211/130.1 |
| 5,127,616 A | 7/1992 | Carney | |
| 5,242,060 A | 9/1993 | Chiang et al. | |
| D379,903 S | 6/1997 | Durham | |
| 5,979,673 A | 11/1999 | Dooley | |
| 6,012,593 A | 1/2000 | Knittel et al. | |
| 6,131,746 A | 10/2000 | Huang | |
| D546,129 S * | 7/2007 | Sergianni | D7/601 |

* cited by examiner

*Primary Examiner* — Korie H Chan

(57) ABSTRACT

A pot lid holding system having a housing with a bottom frame and side frames where each side frame extends upwardly from the bottom frame, and a front and back bar, wherein the front and back bars both connect the first side frame to the second side frame, wherein the bottom frame, the side frames and the bars together form an enclosure with an inner cavity, an indentation in the front bar dips downwardly toward the bottom frame, the indentation is adapted to hold a pot lid, an easel pivotally connected to the housing via a hinge pivot, and a drip tray removably disposed atop the bottom frame, the drip tray is adapted to collect liquids or foods dripping from the pot lid.

5 Claims, 5 Drawing Sheets

FRONT VIEW

TOP VIEW

POT LID HOLDING SYSTEM

FIELD OF THE INVENTION

The present invention is directed to a system for holding pot lids to help prevent messes on countertops and floors.

BACKGROUND OF THE INVENTION

Water and other food or liquids on lids of pots can drip onto the countertop or floor, creating messes. The present invention features a pot lid holding system for holding pot lids. The system of the present invention helps prevent messes and spills.

SUMMARY

The present invention features a holding system. In some embodiments, the holding system comprises a housing comprising a bottom frame, a first side frame and a second side frame, the side frames each extend upwardly from the bottom frame, and a front bar and a back bar, the front bar and the back bar both connect the first side frame to the second side frame, wherein the bottom frame, the side frames, and the bars together form an enclosure with an inner cavity; an indentation disposed in the front bar, the indentation dips downwardly toward the bottom frame, the indentation is adapted to hold a pot lid; an easel pivotally connected to the housing via a hinge pivot; and a drip tray removably disposed atop the bottom frame, the drip tray is adapted to collect liquids or foods dripping from the pot lid.

In some embodiments, the bottom frame is rectangular in shape. In some embodiments, the indentation is U-shaped. In some embodiments, the easel is pivotally attached to the housing at the back bar. In some embodiments, the easel is pivotally attached to the housing at the side frames.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
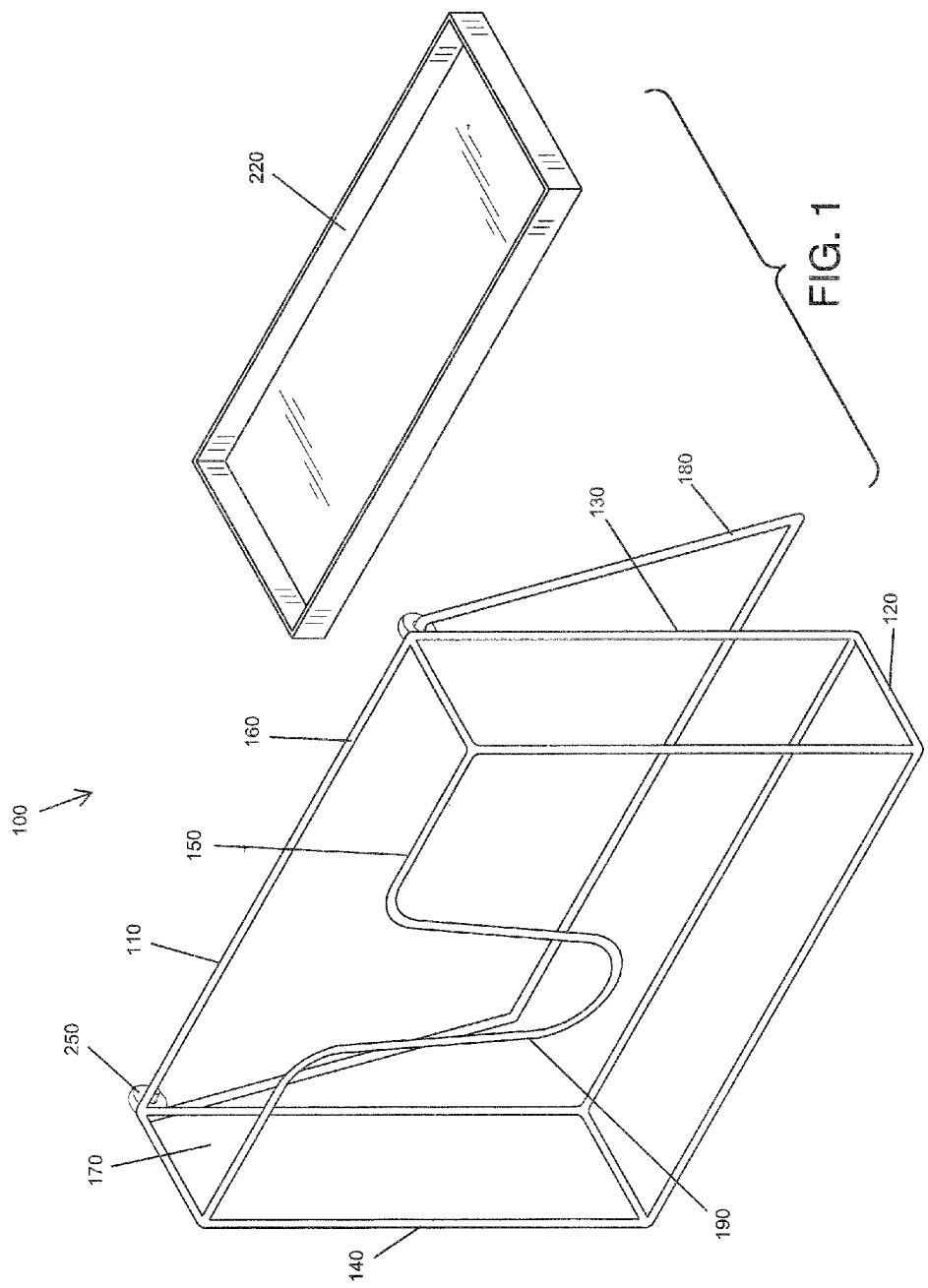
FIG. 1 is a perspective view of the system of the present invention.
Figure 2:
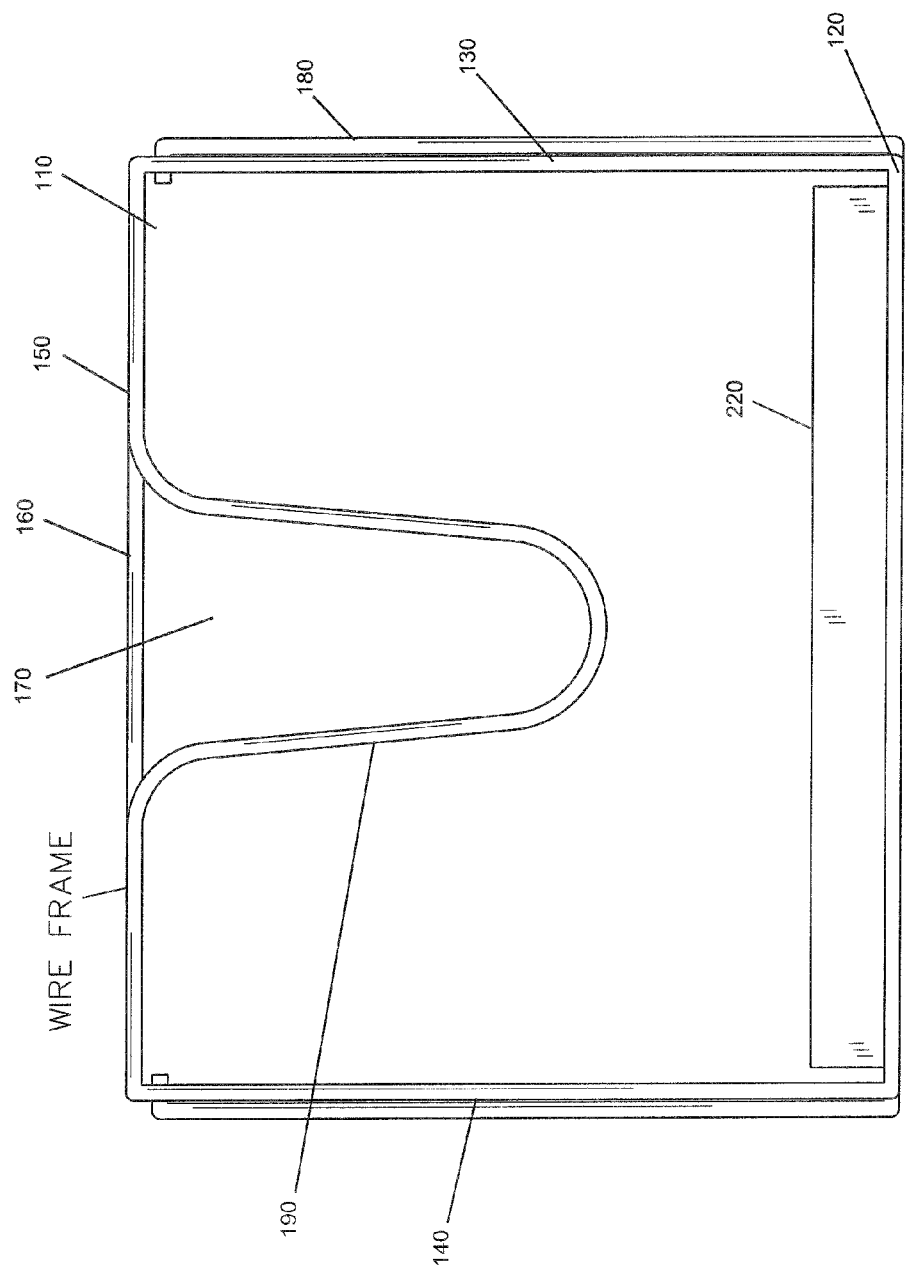
FIG. 2 is a front view of the system of the present invention.
Figure 3:
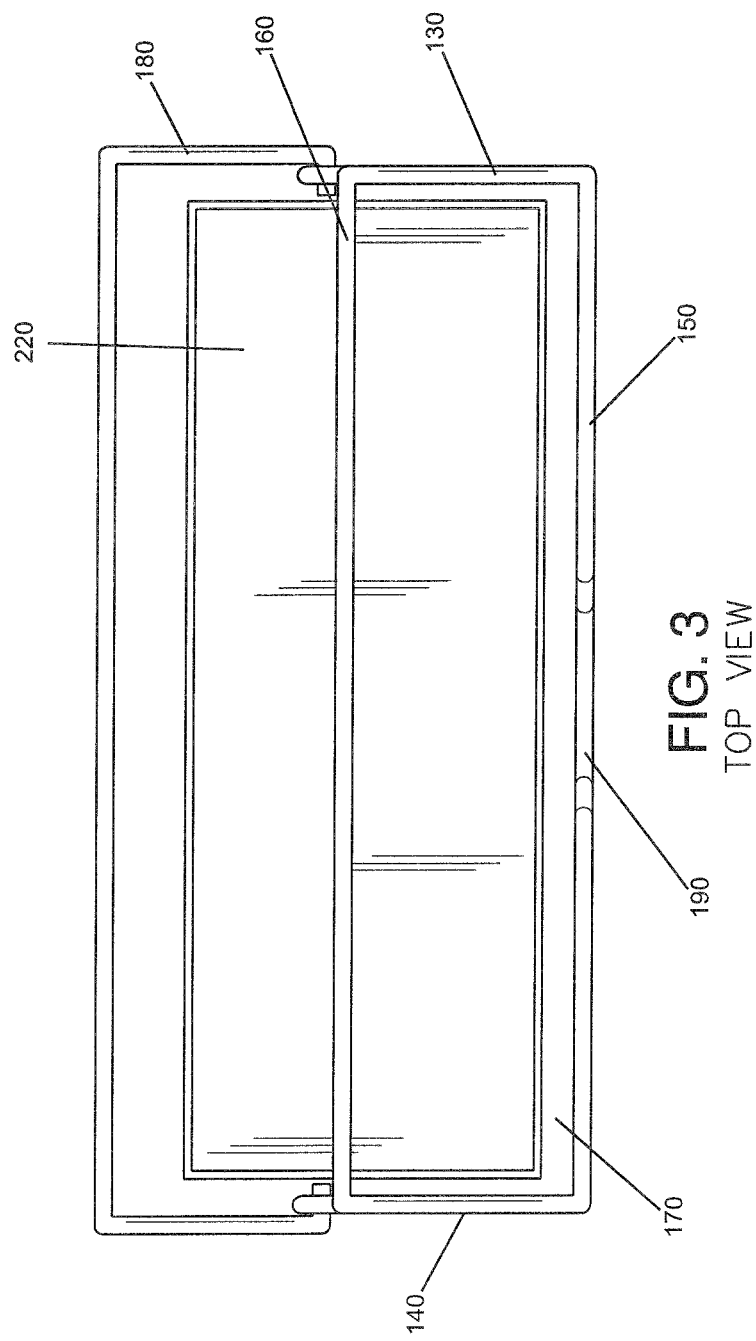
FIG. 3 is a top view of the system of the present invention.
Figure 4:
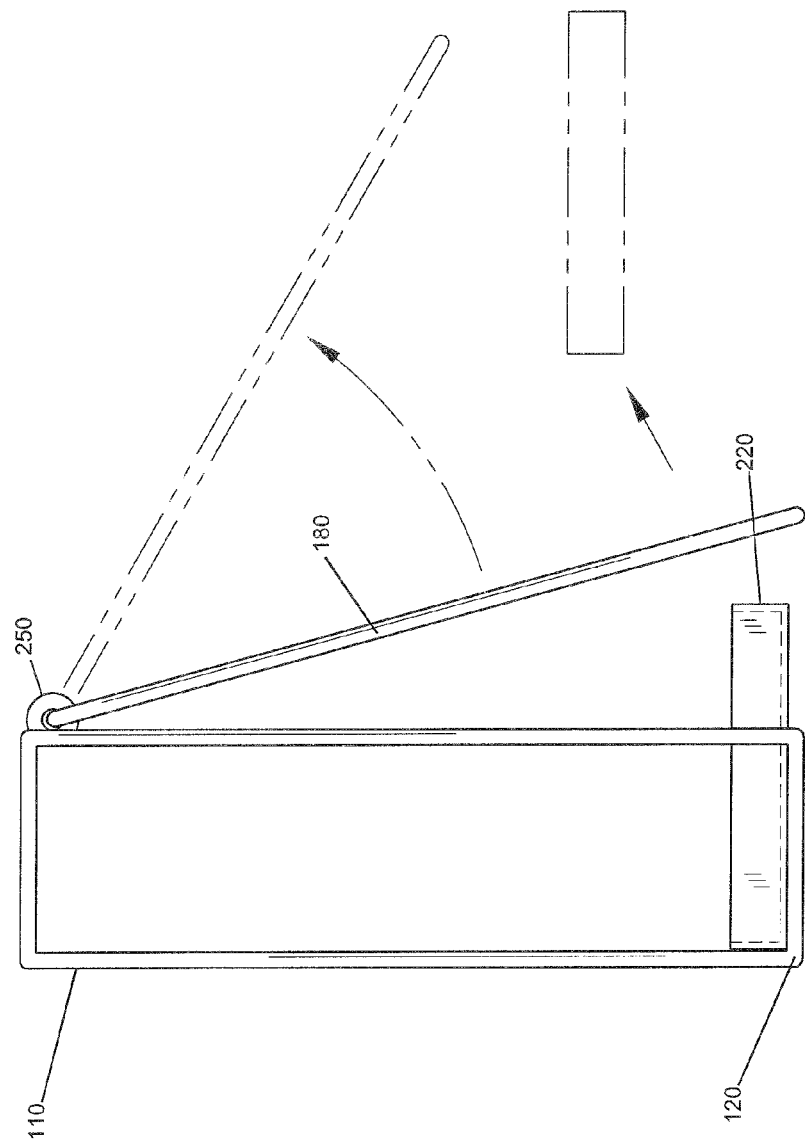
FIG. 4 is a side view of the system of the present invention.

Referring now to FIGS. 1-5, the present invention features a holding system 100 for a pot lid 101. The system 100 of the present invention comprises a housing 110. The housing 110 comprises a bottom frame 120 (e.g., in the shape of a rectangle, oval, etc.). The housing 110 further comprises a first side frame 130 and a second side frame 140, which each extend upwardly from the bottom frame 120. The first side frame 130 is connected to the second side frame 140 via a front bar 150 and a back bar 160. Together, the bottom frame 120, the side frames 130, 140, and the bars 150, 160 form an enclosure with an inner cavity 170. The housing 110 has an open top allowing access to the inner cavity 170.

An easel 180 is pivotally connected to the housing 110 via a hinge pivot 250. In some embodiments, the easel 180 is pivotally attached to the housing 110 at the back bar 160. In some embodiments, the easel 180 is pivotally attached to the housing 110 at the side frames 130, 140.

Disposed in the front bar 150 is an indentation 190. The indentation 190 dips downwardly toward the bottom frame 120. In some embodiments, the indentation 190 is U-shaped. In some embodiments, the indentation 190 resembles a different shape. The shape may be any appropriate shape. The indentation 190 is adapted to hold a pot lid 101 as shown in FIG. 5.

Figure 5:
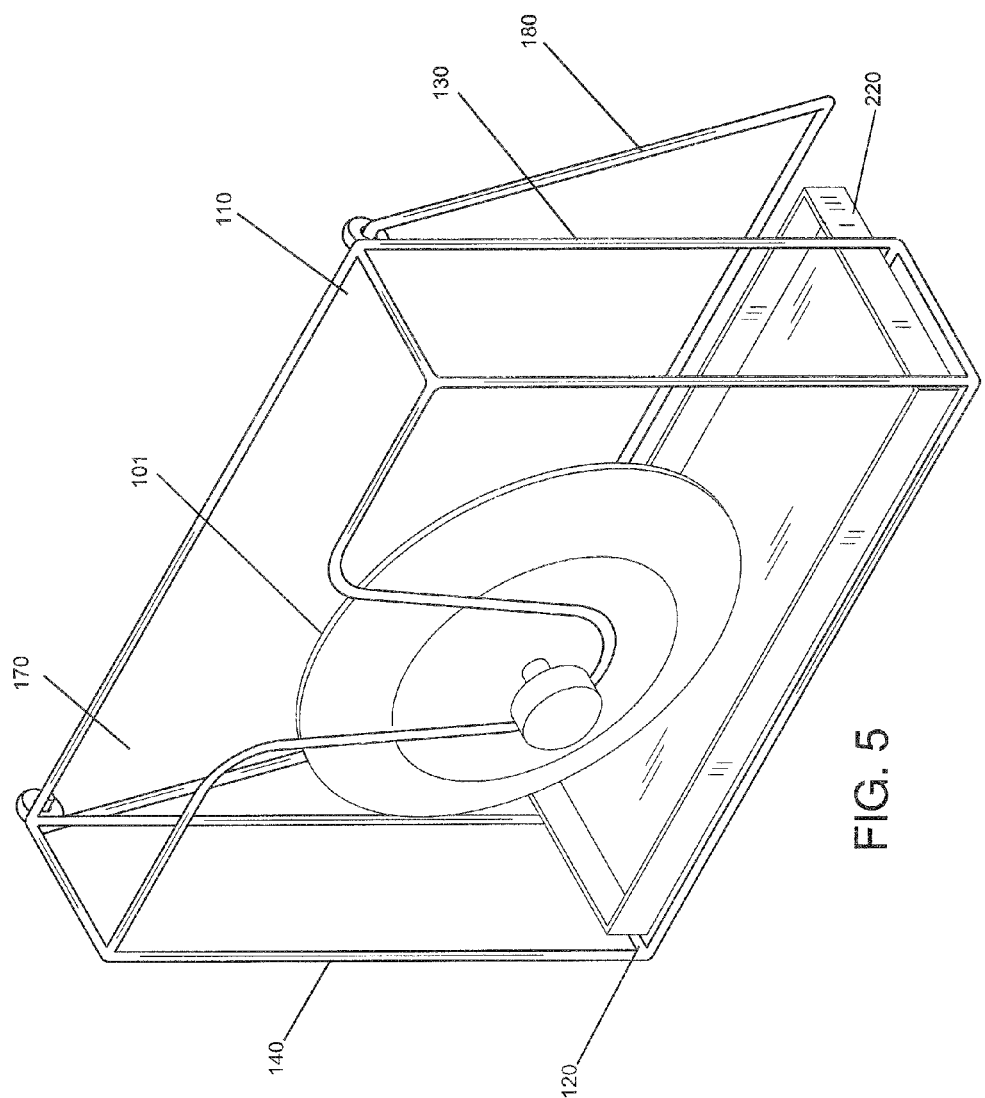
FIG. 5 is an in-use view of the system of the present invention.

The system 100 of the present invention further comprises a drip tray 220 for placing atop the bottom frame 120 (e.g., see FIG. 5). The drip tray 220 is adapted to collect liquids and/or foods dripping from the pot lid 101.

In some embodiments, the housing 110 (e.g., the frames 120, 130, 140) and/or bars 150, 160 are constructed from a wire-like material.

In some embodiments, a gripping component is disposed on the easel 180 to help prevent the easel from slipping.

The system 100 of the present invention may be constructed in a variety of sizes, styles, and designs. For example, in some embodiments, the indentation 190 is about 6 inches in depth (as measured from the top bar 150 to the bottom edge 192 of the indentation 190). In some embodiments, the indentation 190 is between about 2 to 4 inches in depth (as measured from the top bar 150 to the bottom edge 192 of the indentation 190). In some embodiments, the indentation 190 is between about 4 to 8 inches in depth (as measured from the top bar 150 to the bottom edge 192 of the indentation 190). The present invention is not limited to the aforementioned dimensions.

As used herein, the term "about" refers to plus or minus 10% of the referenced number. For example, an embodiment wherein the indentation 190 is about 5 inches in depth includes a indentation 190 that is between 4.5 and 5.5 inches in depth.

The disclosures of the following U.S. Patents are incorporated in their entirety by reference herein: U.S. Pat. No. 4,790,503; U.S. Pat. No. 4,911,310; U.S. Pat. No. 5,000,326; U.S. Pat. No. 5,127,616; U.S. Pat. No. 5,242,060; U.S. Design Pat. No. D379903; U.S. Pat. No. 5,979,673; U.S. Pat. No. 6,012,593; U.S. Pat. No. 6,131,746.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A holding system (100) comprising:
   - (a) a housing (110) comprising a rectangular bottom frame (120), a first side frame (130) and a second side frame (140), the side frames (130), (140) each extend upwardly perpendicularly from the bottom frame (120), and a front bar (150) and a back bar (160), the front bar (150) and the back bar (160) both perpendicularly connect the first side frame (130) to the second side frame (140), wherein the bottom frame (120), the side frames (130), (140), and the bars (150), (160) together form a wire frame rectangular prism enclosure with an inner cavity (170);
   - (b) an indentation (190) disposed in the front bar (150), the indentation (190) dips downwardly toward the bottom frame (120), the indentation (190) is adapted to hold a pot lid (101);
   - (c) an easel (180) pivotally connected to the housing (110) via a hinge pivot (250);
   - (d) a drip tray (220) removably disposed atop the bottom frame (120), the drip tray (220) is adapted to collect liquids or foods dripping from the pot lid (101); and
   - (e) a pot lid (101).

2. The system (100) of claim 1, wherein the indentation (190) is U-shaped.

3. The system (100) of claim 1, wherein the easel (180) is pivotally attached to the housing (110) at the back bar (160).

4. The system (100) of claim 1, wherein the easel (180) is pivotally attached to the housing (110) at the side frames (130), (140).

5. A holding system (100) consisting of:
   - (a) a housing (110) consisting of a rectangular bottom frame (120), a first side frame (130) and a second side frame (140), the side frames (130), (140) each extend upwardly perpendicularly from the bottom frame (120), and a front bar (150) and a back bar (160), the front bar (150) and the back bar (160) both perpendicularly connect the first side frame (130) to the second side frame (140), wherein the bottom frame (120), the side frames (130), (140), and the bars (150), (160) together form a wire frame rectangular prism enclosure with an inner cavity (170);
   - (b) an indentation (190) disposed in the front bar (150), the indentation (190) dips downwardly toward the bottom frame (120), the indentation (190) is adapted to hold a pot lid (101);
   - (c) an easel (180) pivotally connected to the housing (110) via a hinge pivot (250);
   - (d) a drip tray (220) removably disposed atop the bottom frame (120), the drip tray (220) is adapted to collect liquids or foods dripping from the pot lid (101); and
   - (e) a pot lid (101).

* * * * *